United States Patent [19]
Keller et al.

[11] Patent Number: 4,953,479
[45] Date of Patent: Sep. 4, 1990

[54] METHACOAL INTEGRATED COMBINED CYCLE POWER PLANTS

[76] Inventors: Leonard J. Keller; Austin N. Stanton, both of 1501 N. Cedar St., Bonham, Tex. 75418

[21] Appl. No.: 454,141

[22] Filed: Dec. 21, 1989

Related U.S. Application Data

[63] Continuation-in-part of Ser. No. 204,240, Jun. 9, 1989, abandoned.

[51] Int. Cl.$^5$ ................................................ F23B 7/00
[52] U.S. Cl. ................................. 110/233; 60/39.464; 110/234; 122/1 R
[58] Field of Search ................ 122/1 R, 6 R; 110/347, 110/233, 234; 44/51, 500; 60/39.464

[56] References Cited

U.S. PATENT DOCUMENTS 3,575,002  4/1971  Vuia ...................................... 122/1 R
4,766,823  8/1988  Seabury ........................... 110/347 X Primary Examiner—Edward G. Favors
Attorney, Agent, or Firm—James C. Fails; Arthur F. Zobal; Geoffrey A. Mantooth

[57] ABSTRACT

Methacoal Integrated Combined Cycle Power Plants comprise a thermal separation plant for producing condensate liquid fuel and particulate carbonaceous fuel from Methacoal fuels, coal-methanol suspensoids or slurries; gas turbine generator plants for burning the liquid fuel to produce electric power; steam turbine generator plants for producing electric power; a boiler plant for producing steam for steam turbines; a small firebox for burning reative particulate carbonaceous fuel, with minimum retention time for high temperature combustion gases and minimum oxygen required for combustion, thus minimizing emissions of nitrogen oxides and hazardous ultra-fine particulates; and means for controlling ash fusion and slagging problems. The two generating plants are respectively sized to provide the capacity required, and to consume the two fuels in the proportions produced from the Methacoal fuels, during normal operations, allowing fuel inventory control. Gas turbine exhaust gases provide most combustion air for burning particulate fuel. Other uses of gas turbine exhaust heat facilitate control and achieving the high overall efficiencies. Capacity is about one-fourth gas turbine generated power to three-fourths steam turbine generated power for these new plants. Conventional combined cycle power plants have about two-thirds gas turbine generated power and only one-third steam turbine generated power. The invention facilitates low-cost retrofitting of steam power plants. New power plants will be much less costly than other coal or lignite power plants available, including fluid bed combustion plants and integrated gasification combined cycle plants.

17 Claims, 2 Drawing Sheets

SECTION A-A

SECTION B-B

METHACOAL INTEGRATED COMBINED CYCLE POWER PLANTS

CROSS REFERENCE TO RELATED APPLICATIONS

This application is a continuation-in-part application of Ser. No. 07/204,240, filed Jun. 9, 1989, same title, and same inventors abandoned.

FIELD OF THE INVENTION

This invention relates to electric power plants; and particularly to combined cycle power plants.

BACKGROUND OF THE INVENTION

It now seems obvious that dependence on imported crude oils or residual or distilled fuel oils for electric power generation in the remaining free nations of the world is no longer reasonable, since most of the world's remaining economically recoverable crude oil reserves are in a small area of the Persian Gulf and in the Soviet Union. The Soviet Union and a few small nations can essentially control both availability and price of crude oil and petroleum products, world-wide, beyond some point in the near future. This will be a matter of critical importance so long as the world remains heavily dependent on such fuels for primary energy supplies. Control by these nations seems destined to become more dominant as the remaining reserves of economically recoverable crude oil in other areas of the world are rapidly depleted. It is primarily this situation which makes the development of new, alternative means for electric power generation, which are not dependent on petroleum, so critically important.

Sources of economically recoverable natural gas which can be delivered by pipeline are also declining rapidly in the United States. Most of the world's known reserves of natural gas are in areas where production and delivery by pipelines to conventional markets is not economically feasible, and virtually not even possible.

The maximum use of coal for power generation is now widely advocated, because the resources are so very great. However, there are serious problems involved in greatly increasing the use of coal. If the necessary technologies for economical, long distance coal transportation; for utilization of the lower quality coals; and for adequate environmental controls are developed; the known, mineable coal reserves are sufficient to provide most of the world's energy needs for centuries. By comparison, the known reserves of natural gas which is economically recoverable and deliverable by present means may last only a few decades, and serious shortages may evolve in just a few years. The coal resources are widely distributed throughout much of the world, and many nations, which have little or no crude oil or natural gas resources, have coals or lignites available, and could become relatively self-sufficient from the standpoint of their energy needs. Broadening the energy base for all nations would surely serve to stabilize the economies of nations throughout the World, and stimulate the development of many of the emerging nations.

The present state-of-the-art provides various means for utilizing coal or natural gas as alternatives to fuel oils for generating electric power. Some of these are well known, or conventional, and in wide commercial use, others are in various stages of development. Conventional methods include the pulverized coal-fired steam turbine power plants, and gas-fired steam turbine power plants, (the Rankine cycle power plants). Others are the natural gas-fired, open cycle, gas turbine power plants (Brayton cycle plants), and the more efficient natural gas-fired, combined cycle power plants (Brayton/Rankine cycle plants). Many U. S. utility companies have adopted and promoted the use of gas-fired combined cycle plants, because of their low capital cost and high efficiencies, but many are now expressing concern about becoming committed to deliverable natural gas, which surely will once again become limited in supply and high in cost in the near future. The proven, economically recoverable natural gas reserves were recently estimated at seventeen years supply for the United States, at current rates of use. The prospects for significant new discoveries are not good, and the rate of use is growing.

There are some emerging technologies which may prove useful and beneficial to the utility industry. Two types of coal-fired, fluid-bed combustion boilers are under development, and may be useful, at least in relatively small Rankine cycle power plants. They are quite expensive to build, operate and maintain, and produce large amounts of solid waste which must be disposed of, about comparable in this respect to conventional coal-fired plants with limestone scrubbers. They are capable of substantially reducing sulphur oxides and nitrogen oxides emissions, and can use relatively high sulphur coals.

In recent years, the integrated gasification combined cycle (IGCC) power plants have been developed to burn low-Btu gases produced by coal gasification. These plants are very expensive, but have the advantage that they can burn high-sulphur coals and also meet rather strict air pollution standards for sulphur oxides, nitrogen oxides and particulate emissions. The IGCC power plants require first gasifying the coal, then thoroughly cleaning the gas, then burning it in gas-fired combined cycle power plants (Brayton/Rankine cycle plants). In both of the above cases, for the gas-fired combined cycle (Brayton cycle/Rankine cycle) power plants, some additional fuel may be burned in the heat recovery steam generators of the Rankine cycle portion of the plant. This is called "supplementary firing", and can provide some additional capacity, but with reduced efficiency. It is generally not recommended, because with the high cost of the fuels required for such plants, the drop in efficiency makes it uneconomical.

Fully-fired combined cycle plants have been designed and are now in use in West Germany, and perhaps in other areas. (See Gas and Coal-Fired Combined Cycle Plants, a booklet for presentation at the American Power Conference, Chicago Illinois, Apr. 14-16, 1986, Utility Power Corporation). These plants burn natural gas in the gas turbine generators and use the gas turbine exhaust gases for combustion air for burning coal in conventional pulverized coal-fired steam generators for Rankine cycle power plants. Similar plants, designed to burn natural gas and oil, have been proposed in the United States, and a conceptual design was done for Electric Power Research Institute by Westinghouse Electric Company a few years ago. However, these types of plants do not solve the problems of oil and gas availability and the future escalating costs expected for these fuels. Consequently, they would be high risk investments which might result in very high costs for producing power in the relatively near future. It has been proposed that they could be converted to IGCC plants by adding coal gasification plants, when the cost of natural gas and/or oil becomes too high for their practical use as power plant fuels. These would be a very costly conversions, and dependent on conventional coal delivery and handling methods.

Other technologies have been proposed as improved means for utilizing coal to produce electric power, but appear to have only little potential for commercial use. These include the stabilized coal-oil slurry fuels and coal-water slurry fuels, simulating the fluid characteristics of the stable Methacoal fuels, and proposed to replace heavy or residual fuel oils for oil-fired power plants. It is very questionable whether either of these have any real world potential for commercial development. Residual fuel oil prices in the range of forty dollars or more per barrel are considered necessary by most proponents to justify their commmercial development. Both of these slurry fuels have reportedly increased the ash-fusion problems in the boilers, which may be very difficult to overcome, and which imposes costly and wasteful limits on the quality of coal which can be used. Both may compound the problem of the formation of carcenogenic, ultra-fine, one-tenth micron, particulate emissions of vaporized and re-condensed heavy-metal compounds, already plaguing both coal-fired and residual oil-fired power plants. Ultra-clean and ultra-fine coal is considered a prerequisite for firing of coal-water slurries, and this prices these fuels at levels too high to provide significant profit potentials or incentives for their development.

New developments in these fields, which may lead to commercial utilization, include the improved coal-oil slurry fuels, see U.S. Pat. No. 4,089,657, May 16, 1978, Stabilized Suspension of Carbon in Hydrocarbon Fuel and Method of Preparation). This process uses methanol to improve both rheological characteristics and combustion characteristics of the coal-oil slurry fuels. New developments in coal-water slurry fuels, also using methanol for improving the rheological and combustion characteristics of the slurry fuels, are pending, (see U.S. Pat. Application Ser. No. 185391, Feb. 22, 1988, Stabilized Suspensions of Carbonaceous Fuel Particles in Water), now allowed for issuance.

Magnetohydrodynamics has been under development for several decades with little chance for success. Coal-chemical batteries for direct conversion of coal to electric power have been proposed also, but seem to have limited if any potential.

Conventional coal-fired steam power plants have almost reached the practical limits of expansion in the United States, because of the limitations of siting with respect to coal supply, length of power lines required for transmission of power from mine-mouth plants, transportation difficulties in delivering coal to plants located near the load centers, problems in meeting clean air requirements for exhaust gases, and limits on coal quality which are required for operating the standard types (state-of-the-art) boiler plants now available. The necessary coal quality limits, imposed by design limitations of the power plants, render most of the U. S. coal resources unusable, with today's boiler and combustion designs and exhaust cleaning capabilities. Users must set rigid standards to insure reliable operations, and valuable coal resources must be left unused and are often degraded or wasted by selective mining requirements to meet the imposed standards, or to gain bonuses for high quality. This presents very serious, but generally unrecognized, conservation problems, which are greatly in need of technical and scientific solutions. The present invention contributes greatly to those solutions.

New, patented technologies for providing superior-quality boiler fuels from coal, or from coal and remote natural gas, for use in converted oil-fired type boilers, could allow circumventing many of the problems associated with other coal slurry fuels, but Industry has been slow to adopt their use. These are the unique coal-methanol slurry fuels and the coal-methanol-water slurry fuels herinafter referred to as Methacoal or Methacoal fuels. These fuels actually burn better and provide better performance than residual oils or heavy fuel oils in boilers designed for oil firing. Methacoal fuels (slurries or suspensoids) were developed by one of the present inventors, and patent applications were filed before the more recently popularized development of stabilized coal-oil slurry fuels and coal-water slurry fuels. The development of these later slurry fuels evolved from the development of the Methacoal fuels (coal-alcohol slurry fuels and coal-alcohol-water slurry fuels), from the new rheological and combustion technologies originated and revealed by the developing company, and from the patents cited hereinafter. The potentials for Methacoal boiler fuels development, as replacements for residual and heavy fuel oils, is very great. More than one hundred thousand megawatts of power plant capacity in the United States alone could be converted at savings of tens of billions of dollars to the Utility Industry.

However, even more advantageous means for utilizing coal or lignite and natural gas resources together, or coal or lignite resources alone, delivered as anhydrous or low moisture content Methacoal fuels, are urgently needed. The improved means should be capable of accelerating the development and utilization of these resources, of reducing the exhaust gas pollution levels, of reducing fuel consumption (or heat rates), and of making the remote natural gas resources and the low-quality, high moisture content coal resources, (which are usually also low-sulphur coals or lignites), profitably useful as high-quality power plant fuels. This necessitates the use of the unique, Methacoal-derived liquid and particulate fuels, delivered as Methacoal slurry fuels, then separated at the power plant; and the development of a new type of high efficiency power plant to make optimum use of the unique fuels provided. This makes both the remote natural gas (natural gas which cannot be economically delivered to conventional markets) and distant or remote coals or lignites easily and economically transportable for great distances to the power plant facilities located near the load centers. The present invention provides these means.

The use of natural gas as boiler fuel for gas-fired steam generation plants has been greatly expanded in the United States during the past several years, even though there are estimates indicating only seventeen years of remaining proven reserves, and not very good possibilities of finding significant new reserves which are economically recoverable and transportable by pipeline. Also, gas turbine peaking units and cogeneration plants based on natural gas firing have become popular and widely developed, because they are low-cost and economically attractive for the very short near-term future, while natural gas prices are depressed by low oil prices and temporary surpluses of production capacity.

The United States should be seeking means for effecting conservation of the precious, and non-replenishable, natural gas resources, and for limiting their use to only the most efficient means available. There are now about ten fewer years of natural gas reserves remaining than there was at the time the United States Congress first passed legislation to curtail the wasteful inefficient use of natural gas as fuel for power plant boilers. The very wasteful use of any pipeline deliverable natural gas as boiler fuels should probably again be curtailed, and will have to be at some point in time. The temporary excess of production and delivery capability has apparently misled many into believing that the natural gas resources are virtually undiminishable.

The use of remote and otherwise valueless natural gas for the production of fuel grade methanol, which could then be transported economically to user locations and burned as fuel for combined cycle power plants, gas turbine generators or even as boiler fuel for Rankine cycle power plants, has been proposed many times in the past, and is now again being proposed by some. The economics, however, were never sufficiently attractive for this to be done commercially, even though it would accomplish significant environmental improvements, even compared to burning natural gas.

However, the use of such methanol to process and transport coals or lignites, thereby reducing the costs of transportation for energy derived from the natural gas and also from the solid fuels, and also improving the quality of the coal-derived fuels, provides efficient resource utilization and reasonably low fuel costs. The production, transportation and use of Methacoal fuels can make the use of the remote natural gas resources technically, economically and environmentally feasible for providing fuels to replace residual and heavy fuel oils even at the present "cheap" oil prices.

Even though the potentials for Methacoal fuels development for replacing fuel oils is great indeed, commercial development has been delayed by the large investments required for facilities, and by complacency, fear of change, and fear of the power of either OPEC or Saudi Arabia to lower world oil prices to levels at which no alternative fuels could compete. As an example, when crude oil prices were dropped to under ten dollars per barrel, recently, Methacoal fuels were not sufficiently competitive to encourage would-be investors to fund their development. This is no longer the case.

Conversion of remote natural gas to liquid natural gas (LNG) for transport and then for use as fuel for power generation is too costly, wasteful and dangerous to be practically or economically viable. Obviously, improved new means for more efficient and profitable use of remote natural gas, which is so abundantly and widely distributed throughout much of the world, are also urgently needed. This can have a really beneficial, stabilizing effect on world economics and encourage free trade in ways not susceptible to monopolization.

The present invention, as will be shown, provides practical solutions to many of the existing problems of coal and remote natural gas utilization. It can also provide expanded use of the relatively low sulphur content coals and lignites to gain substantial environmental improvements, while the development of coal cleaning technologies materialize and becomes technically and economically feasible. When the high sulphur content coals can be cleaned sufficiently and economically, to allow their economical use, it may be preferable in many cases to use the cleaned coals as Methacoal fuels in the improved power generation facilities provided by the present invention, instead of relying on current state-of-the-art power generation technologies.

It is desirable that the present invention provide the following features:

1. The invention should provide a new type of coal-based, combined cycle power plant which can be provided by the retrofitting of existing steam-turbine power plants or gas-turbine power plants, or by constructing new, low-capital-cost, fuel-integrated combined cycle power plants, which do not require coal gasifiers, fuel gas cleaning systems, or air reduction oxygen plants for preparation of gaseous fuels, as do the integrated gasification combined cycle power plants.

2. The invention should provide cost effective and energy efficient means for utilizing the unique characteristics and potentials of the coal-methanol slurry fuels, called Methacoal fuels, (see U.S. Pat. No. 4,045,092, Aug. 30, 1977, Fuel Composition and Method of Manufacture), to facilitate the low-cost production and transportation of fluid fuels derived from coals or lignites alone, or derived from coals or lignites and remote or other low-cost natural gas; and should also provide means for utilizing the unique liquid fuels and particulate solid fuels which can be separated from Methacoal fuels, (see U.S. Pat. No. 4,192,651, Mar. 11, 1980, Method of Producing Pulverulent Carbonaceous Fuels).

3. The invention should provide a new type of fuel-integrated, coal-based, combined cycle power plant with heat rates, (or fuel conversion efficiencies), in the same range of, or greater than, those of the natural gas-fired or oil-fired, combined cycle power plants with heat recovery power generation systems, and greater than those of the proposed fully-fired, natural gas and coal-fueled, combined cycle power plants.

4. The invention should provide a new type of coal-based combined cycle power plant which can make possible the efficient and economical use of many low-rank, low-sulphur, high-moisture-content coals and lignites, which either cannot be burned, or can only be burned with great difficulty and low efficiencies, in the state-of-the-art, conventional power plants; because of the low ash fusion temperatures, the ash buildup characteristics, the very high ash content, or the very high moisture content of such fuels.

5. The invention should provide effective and profitable means for developing and utilizing remote natural gas, (which has little if any value for other uses), and oil-associated natural gas resources; which may otherwise be wasted by flaring or left undeveloped because of the very high costs of long-distance pipeline transportation of natural gas or the high costs and safety problems associated with liquid natural gas production, transportation and storage.

6. The invention sould provide a new type of power plant which can achieve significant reductions in sulphur oxides emissions by economically using low or medium sulphur content coals or lignites from distant sources, and by also effecting approximately fifty percent additional reduction in sulphur oxides emissions compared to burning the same low-sulphur coals or lignites in conventional power plants without chemical scrubbers.

7. The invention should provide a new type of power plant for which sites can be selected as optimum with respect to the power load center and the existing power distribution system, and the fuel can be delivered to the plant site from distant coal and lignite resources and remote natural gas resources, and no rail, ship or barge transportation of bulk coal or stockpiling of bulk coal is required.

8. The invention should provide a new type of coal-based power plant which can operate with very low nitrogen oxides levels in the exhaust gases, but without prohibitively expensive chemical scrubbers for nitrogen oxides removal, while incorporating the new technologies for nitrogen oxides reduction, (see U.S. Pat. No. 4,742,784, May, 10, 1988, Methods for Reducing Nitrogen Oxides Emissions from Power Plants Fired by Various Fuels), in addition to the other pollutant reductions described herein.

9. The invention should provide for combustion of the Methacoal-derived pulverized solid fuels with minimum production of the ultrafine, minus one-tenth micron particle-size, (and probably carcinogenic), condensates of heavy metals and heavy metal compounds, which are typically found in great quantity in the exhaust gases from most coal-fired and residual oil-fired power plants. See article by EPRI/DOE researchers, "Size Distribution of Fine Particles from Coal Combustion", Science (AAAS), 1 Jan. 1982, Volume 215, Number 4582.

10. The invention should make possible the use of low-cost, low-pressure, suspensoid pipelines, (Methacoal pipelines), of all sizes, (using low-cost centrifugal pumps); and tanker ships and barges, to replace railroad transportation of coal and long-distance, high-voltage power transmission lines.

11. The invention should provide coal-based power plants of any size at lower capital cost than alternative power generation means, provide for low-cost retrofitting of existing power plants, and provide more economical means for generating and delivering electric power to the consumers, thus benefitting the economies of the geographic areas and the nations where the technologies are utilized.

SUMMARY OF THE INVENTION

It is an object of this invention to provide one or more of the features delineated as desirable hereinbefore and not heretofore provided by the prior art.

It is a specific object of this invention to provide substantially all of the features delineated hereinbefore as desirable and not heretofore provided by the prior art, and specifically those features listed in the preceding section and numbered 1 through 11.

These and other objectives will be apparent from the descriptive matter hereinafter; particularly when taken in consideration with the appended drawings.

In accordance with this invention there is provided a means of utilizing anhydrous or low moisture content Methacoal (coal methanol slurry) fuels, employing the use of remote low-value natural gas resources and/or distant, low-sulfur coal or lignite resources to provide fuels for electric power generation at the point of need with respect to the power load center and the power distrubution system; and also provided a new type of power plant called the Methacoal Integrated Combined Cycle (MICC) Power Plant, specifically designed to utilize Methacoal-derived fuels and to provide low capital cost, new or retrofit, electric power generation facilities and low-cost, low-pollution, high-efficincy electric power generation.

DETAILED DESCRIPTION OF THE INVENTION

Figure 1:
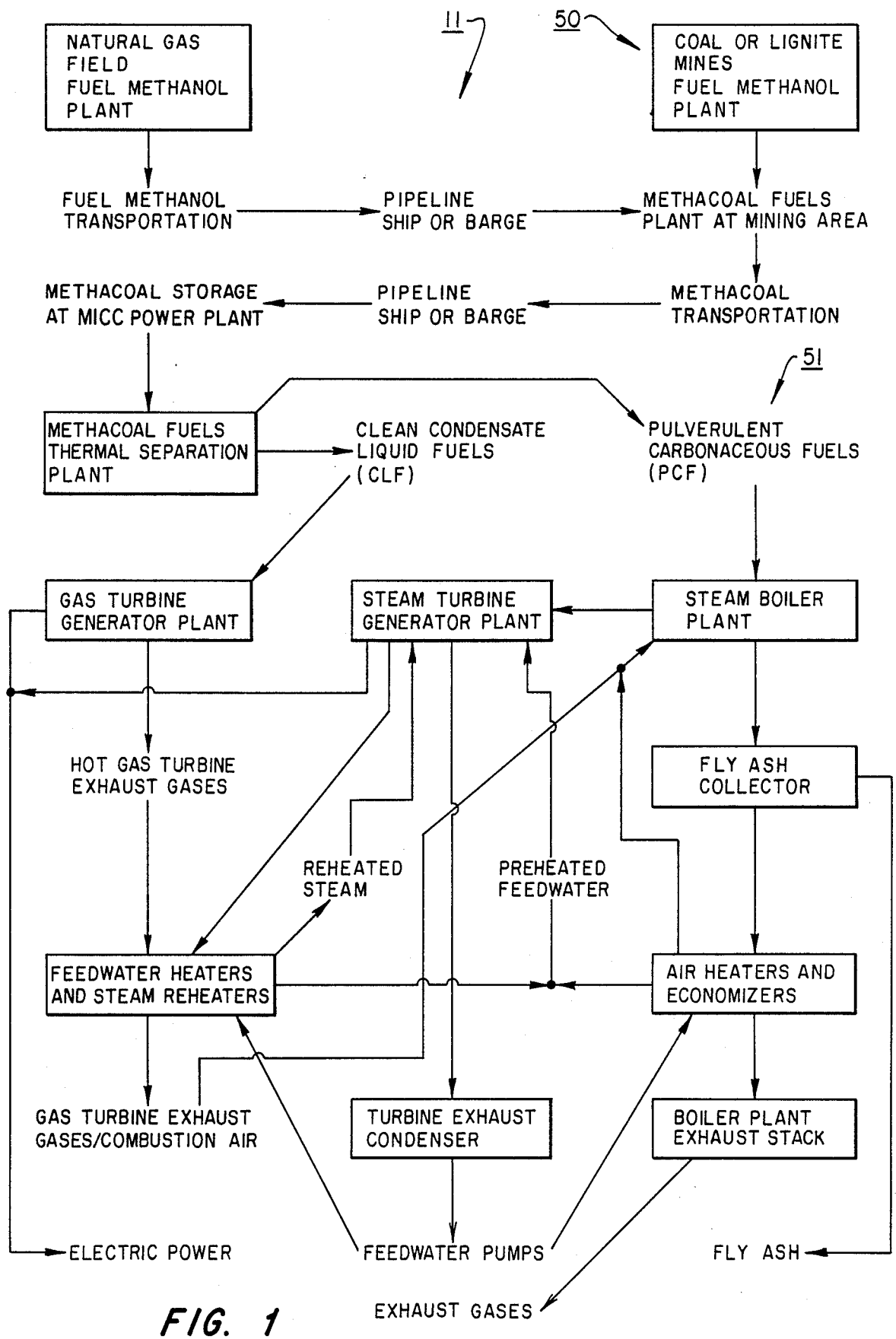
FIG. 1 is a block-flow diagram showing unique means for utilizing remote, low-value resource materials to provide low-cost electric power at the point of need on the power distribution system. The diagram shows resources and facilities, their interrelationship, means of transportation, flow of materials, generation of electric power in the new highly efficient MICC power plants, and delivery of electricity to the power distribution system.

Referring to FIG. 1, the present invention, in the form of the Methacoal Integrated Combined Cycle (MICC) Power Plant 51, provides low-capital-cost, fuel-integrated, fully-fired, combined cycle electric power plants, uniquely designed with the capability to utilize both the clean condensate liquid fuels (CLF) and the highly reactive pulverulent carbonaceous fuels (PCF) produced from Methacoal fuels (coal-methanol slurries, or more accurately, suspensoids), in the proportions provided by separation of the Methacoal fuels. Methacoal fuels are delivered to the thermal separation plant at the MICC power plant site as slurries, or suspensoids, of coal or lignite-derived particulate material and methanol, or crude methanol, or crude alcohols which are predominantly methanol, see Methacoal Fuel System 50. Methacoal fuels are stored as feedstock for the thermal separation plant, and CLF and PCF are stored to provide fuels inventory for operation of the MICC power plant.

The clean CLF is used as fuel for the gas turbine generator portion of the MICC power plant, and the PCF is used as fuel for the boiler of the steam turbine generator portion of the MICC power plant. The hot exhaust gases from the gas turbine, or turbines, are used as preheated combustion air for burning of the highly reactive PCF in the uniquely small fireboxes of the specially designed boiler plants, or steam generation plants, of the steam turbine generator portion of the MICC power plants. Flyash collection and disposal are provided for the boiler plant exhaust gases to minimize the environmental effects of operating the facilities. The information of U.S. Pat. No. 4,742,784 is incorporated herein by reference for any details omitted herefrom.

The gas turbine generator plant and the steam turbine generator plant are sized in relation to one another so that during normal modes of operation essentially all of the CLF can be burned in the gas turbine power plant, essentially all of the PCF can be burned in the boiler firebox of the steam turbine power plant, and all of the gas turbine exhaust gases can be used as combustion air for burning the PCF to provide optimum efficiency, with some supplementary ambient air or preheated ambient air used as necessary. The MICC power plants are designed so that any one or more of the power generation units can be operated independently, if desired or necessary, for limited periods of time from stored fuels.

Power generation rates of the gas turbine generator plants and the steam turbine generator plant are cycled up and down together at the optimum fuel use ratio for load following, to the extent this is practical. When greater turndown is required than can be accomplished at the optimum fuel use ratio, optimum use will be made of gas turbine exhaust heat as long as both types of units are operating. This can be done by passing the excess of gas turbine exhaust gases through the lower temperature sections of the steam boiler plant, bypassing the firebox and superheater and reheat sections, in order to recover some of the heat energy from the gas turbine exhaust gases not used as combustion air.

Uniquely small fireboxes must be employed in designing the MICC power plants, because low-temperature exhaust gas heat from the boiler plant cannot be used to preheat combustion air, as is done in conventional power plants. Consequently, that heat must be used to preheat feedwater, and therefore less heat can be recovered from the walls of the fireboxes by heating feedwater. The volume of the fireboxes must be smaller than conventional power plants in order to accommodate the rapid combustion of the highly reactive fuels.

Figure 2:
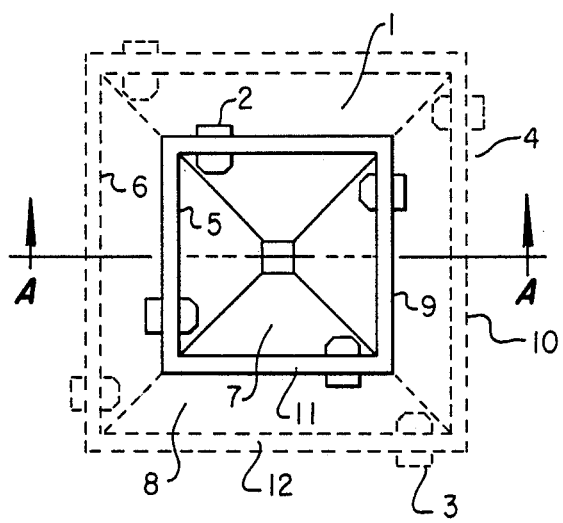
FIG. 2 is a horizontal cross-section, or plan view, showing a preferred embodiment of a uniquely small firebox, a square design, with corner firing, and also showing the approximate relative dimensions of the new type of fireboxes compared to conventional fireboxes used for pulverized coal firing.

FIG. 2 is a horizontal cross-sectional view, or plan view, looking downward into the uniquely small firebox 1, showing a preferred embodiment thereof as a square design, with corner firing of PCF using gas turbine exhaust gases as combustion air, and using burners 2, similar to burners 3 used for burning pulverized coal with preheated combustion air in conventional fireboxes 4. A conventional firebox and burners are shown with dashed lines illustrating, approximately, the relative sizes or dimensions of the fireboxes 1 and 4, and showing the water tube-lined walls 5 and 6, and the bottom-ash hoppers 7 and 8 at the bottom of said fireboxes. The outer metal shells 9 and 10 are lined with refractories 11 and 12, for mechanical support, protection of the shell from the high temperature gases, and reduction of heat losses from the fireboxes.

Figure 3:
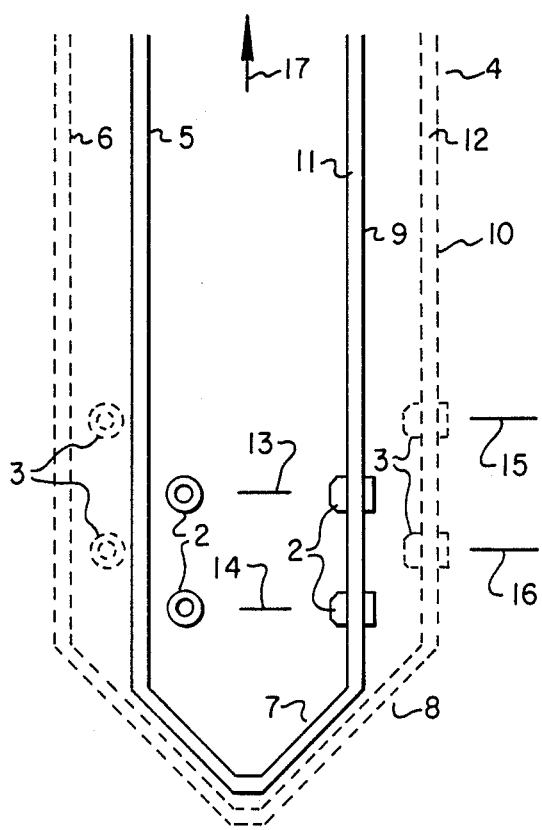
FIG. 3 is a vertical cross-section of the firebox of FIG. 2, taken along line "A—A" of FIG. 2, and also showing the relative dimensions of this new type of firebox and a conventional firebox for pulverized coal firing.

FIG. 3 is a cross-sectional view of the same fireboxes 1 and 4, taken vertically throught the center of the fireboxes, on section "A—A", and showing the burners 2, on two different levels 13 and 14, in firebox 1, and showing the burners 3, at two different levels 15 and 16, in firebox 4. Additional burners may also be placed on other levels or in different locations in some designs. Nucleate boiling-section tubing, not shown, must be placed to first receive the the exit combustion gas stream 17, from the new type of fireboxes 1, before these high temperature gases reach the superheater tubing of the boiler. This is required in order to reduce the temperatures of the firebox exit gases to acceptable levels before they come in contact with the superheater tubing. Superheater tubing cannot tolerate combustion gas temperatures as high as can the water-tube lined firebox walls or the nucleate-boiling section tubing.

Figure 4:
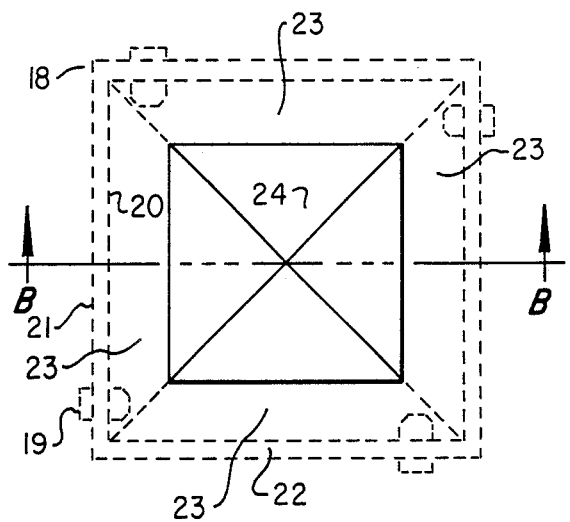
FIG. 4 is a horizontal cross-section, or plan view, of a retrofitted firebox of a previously conventional coal-fired or lignite-fired power plant, showing the means for reducing the volume of the firebox.
Figure 5:
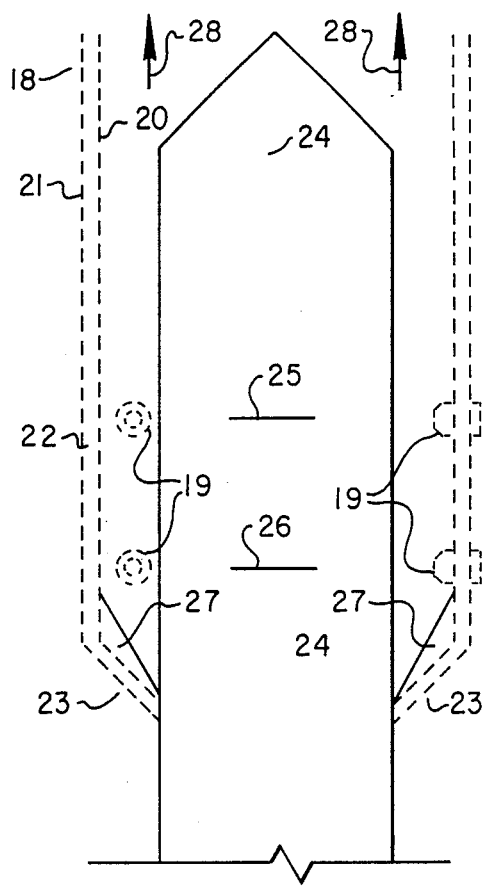
FIG. 5 is a vertical cross-section of the firebox of FIG. 4, taken along line "B—B" of FIG. 4, and showing further details of the means for firebox volume reduction for retrofitting to provide MICC power plants.

FIG. 4 is a horizontal cross-sectional view looking downward into the firebox 18, of a retrofitted conventional pulverized coal-fired power plant, with burners 19, watertube lining 20, outer shell 21, refractory lining 22, and bottom-ash hoppers 23, all shown in dashed lines, and the water-cooled or air-cooled refractory-covered plug 24, used for reducing the effective volume of the firebox. This reducion in volume is required when retrofitting previously coal-fired or lignite-fired power plant boilers to provide the steam generation portion for Methacoal Integrated Combined Cycle Power Plants, and to minimize the nitrogen oxides formation in the combustion gases. FIG. 5 is a cross sectional view of the firebox 18, shown in FIG. 4, taken vertically on section "B—B", at the center of the firebox, and showing the burners 19, on two different levels 25 and 26, in the firebox, and showing the refractory-covered plug 24, added in retrofitting. The reduced size bottomash hoppers 23, are sufficient for the ash which accumulates under the new combustion conditions and the higher upward combustion gas velocities provided. The firebox watertube heat-exchange surface areas may be reduced, when retrofitting, if desired or necessary, by covering over some of the tubing at the botttom of the firebox with refractories 27.

Additional nucleate-boiling section tubing, not shown, must be placed in the exit gas stream 28, from the retrofitted fireboxes, before the superheater tubing of the retrofitted boiler. This is required in order to reduce the temperatures of the firebox exit gases to acceptable levels before they come in contact with the superheater tubing. Superheater tubing cannot tolerate combustion gas temperatures as high as can the water-tube lined firebox walls or the nucleate-boiling section tubing. Various tubing arrangements may be used to accomplish this requirement.

Sufficient heat is removed from the gas turbine exhaust gases, prior to using those gases as combustion air for burning of the PCF, to reduce the temperature of the gases sufficiently to thereby minimize or eliminate ash fusion and slagging problems in the fireboxes of the steam boiler plant. This provides fuel flexibility for the MICC power plants, and allows the use of coals or lignites for Methacoal fuels production which either cannot be burned, or can only be burned with difficulty, in conventional coal-fired or lignite-fired power plants. This is very important from the standpoint of conservation. When excess heat is removed from gas turbine exhaust gases, it may be used for preheating of boiler feedwater, preferably in series with and after the steam generation plant economizer/feedwater heaters. Such heat can also be used for reheating of steam either in series or in parallel with the boiler plant steam reheaters, which provides good plant flexibility and control. Combination of these two uses and varying of the amounts of each may be employed to optimize specific power plant designs.

Economizers are provided for the initial heating of boiler feedwater, utilizing heat from the boiler plant exhaust gases, which is the lower temperature exhaust heat typically used to preheat most or all of the combustion air in conventional coal-fired or lignite-fired plants. The initial boiler feedwater heating may be done at an intermediate pressure, much lower than the boiler pressure, to reduce the pressure requirements of the economizer heat exchangers, and consequently their cost. This will also allow the use of more expensive corrosion-resistant materials for construction of the economizers, since much less material will be needed. A minimal amount of ambient combustion air may also be preheated for the PCF burners to accelerate the initial combustion for PCF.

Some combustion exhaust gases from the steam boiler plant, (or stack gases), taken after the fly ash collectors, may be recirculated to the firebox or to parts of the boiler plant after the firebox for reducing temperatures of the products of combustion for minimizing nitrogen oxides formation, for controlling ash fusion or slagging problems, or for facilitating control of the temperature profile throughout the boiler plant. The feedwater heating, nucleate boiling, superheating and reheat sections of the boiler plant are all designed for near-optimum performance with the smaller fireboxes required, with the unique combustion characteristics and unusual heat release properties provided by the highly reactive PCF, and with the lower oxygen content of the gas turbine exhaust gases used as combustion air, and the consequently higher combustion gas volumes and velocities through the steam boiler plant.

Fuels and energy may be conserved as a result of the very high efficiencies which can be achieved by these MICC power plants. Heat rates, (Btu per kilowatt hour), are expected to be equal to or lower than those of natural gas-fired combined cycle power plants with exhaust heat recovery steam generators and steam power generation systems. This will surely be the case for the MICC power plants which are designed to operate at the higher steam temperatures and pressures or in the supercritical range, or with multiple reheat cycles. Draft control fans or blowers, if used between the gas turbine exhaust heat exchangers and the burners for the PCF, will reduce gas turbine exhaust pressures and facilitate gaining highest gas turbine efficiencies. They will also provide good control of firebox and boiler housing pressures, operating in controlled relationship with the exhaust gas fans or blowers after the fly ash collectors and before the exhaust stack. The condensate liquid fuels, which are primarily fuel methanol, will provide about ten percent higher gas turbine efficiencies than would natural gas firing, and even higher relative efficiencies compared to burning fuel oils in gas turbines. This contributes greatly to the high overall MICC power plant efficiencies attainable.

Since gas turbines fueled by fuel methanol, or CLF, operate at lower maximum temperatures than do natural gas-fired or oil-fired gas turbines, and are therefore not temperature limited as the others are, some combustion air for the gas turbines of MICC power plants may be preheated as a means of further improving overall plant efficiency. There will be a slight increase in gas turbine exhaust gas temperatures and heat content, but this heat energy is recovered and reused at high efficiency, therefore there is some efficiency gain involved. The preheating of this ambient air allows using lower temperature heat from the steam boiler plant exhaust gases, than does the economizer/feedwater heaters. This provides a small increase in overall plant efficiency. There is another synergism involved as well, since when the steam boiler plant and steam turbine generator plant are not operating, the gas turbine or turbines will have more power capacity operating on the lower temperature ambient air, but naturally at somewhat lower efficiency. The higher efficiencies will be attainable at all times when both the gas turbine power plants and the steam turbine power plants are operating within the normal capacity ranges, which will be most of the total operating time.

The increased availability of convection heat from the boiler economizer section, for feedwater heating, is compatible with the reduced need for firebox volume for the very reactive PCF burned, since the firebox wall tubing is generally used primarily for bringing feedwater up to boiling temperature or near to boiling temperature. More combined radiant/convection tubing can be used in these boilers than is generally used in conventional coal-fired or lignite-fired plants. This should reduce the cost of the boiler plants and provide better control of load following operation of the boiler and steam turbine generator plants. The smaller firebox volume and shorter retention time of the products of combustion, at the maximum temperatures, will reduce nitrogen oxides formation in the steam boiler plant, and also reduce the production of ultra-fine particulates of vaporized and recondensed heavy-metal laden materials, (possibly carcinogenic), which are typical of conventional coal, lignite and residual fuel oil-fired power plants, (see Science, Vol. 215, 1 Jan. 1982).

The sulphur oxides emissions per unit of power produced will be reduced by about fifty to sixty percent, compared to burning the same coal or lignite used in producing the Methacoal fuels in conventional coal-fired or lignite-fired power plants without chemical scrubbers and at the same power capacity. The nitrogen oxides emissions per unit of power generated are expected to be reduced by fifty to eighty percent compared to conventional coal-fired or lignite-fired plants without nitrogen oxides removal from the exhaust gases. The emissions of ultra-fine, one-tenth micron particle size range, heavy-metal laden, particulate materials per unit of power generated is expected to be reduced to insignificance.

A steam turbine exhaust extraction system may be used to provide low-pressure, saturated, or slightly superheated, steam to supply the heat energy for effecting separation of the Methacoal fuels in the thermal separation plant to produce CLF and PCF. This allows high-efficiency reuse of the steam, as in cogeneration of electric power and process steam. Energy may also be conserved by taking the vaporized CLF from the thermal separation plant directly to the gas turbine generator plant, and burning it as high-pressure vapor in the gas turbines. To supplement this system, stored liquid CLF may also be pressurized, vaporized and superheated, then burned in these same gas turbines as needed, thus it is not necessary to store CLF vapor, which would be costly and perhaps also dangerous. Vaporizing and superheating the methanol before burning it in the gas turbines adds about two percentage points to the gas turbine efficiency.

Improved coal-water slurry fuels, stabilized and activated by methanol, may be produced from the Methacoal fuels by evaporating off most of the methanol therein and replacing it with water. This is easily accomplished by admitting low-pressure steam to the Methacoal fuels to provide the heat for vaporization and also some of the water for slurrying. The steam can be generated very economically from untreated water by use of steam turbine exhaust extraction steam in steam-to-steam heat exchangers. The activated coal-water slurry fuels can then be burned in the steam boiler plant instead of burning PCF. This allows handling, storing and burning a fluid, or slurry, type fuel instead of the dry, powdered PCF. The slurry fuel combustion characteristics may be better suited to some boiler plats, especially the oil-fired retrofitted plants, than are the PCF fuels.

Technologies are now available for removing both organic and inorganic sulphur from coals, and may be incorporated as an integral part of the process for separating the Methacoal fuels to produce CLF and PCF. The method requires Methacoal fuels as feedstock for removal of sulphur from the coal or lignite, and heat energy requirements can be provided economically from steam turbine exhaust extraction steam from the steam turbine generator plant.

The capital cost for new MICC power plants is expected to be in the range of fifty to sixty percent of the cost for new, conventional coal or lignite-fired power plants with chemical scrubbers. The capital costs for retrofitting of existing power plants, such as oil-fired or coal-fired plants, will be very minimal, probably about fifteen to twenty-five percent of the cost of new, conventional power plants with the same capacity as the retrofitted facility. Some uncontaminated components of abandoned nuclear power plants, and much of the basic facilities, could be effectively used for providing retrofit MICC power plants in order to reduce capital expenditures for the MICC power plants thus provided.

The present invention also provides the means for effecting profitable, efficient, and beneficial development and utilization of resource materials which are otherwise of very limited value or of no value whatever. These resources are the low-sulphur coal and lignite resources which are located too far from the point of need to be economically useable, and the remote natural gas and oil-associated natural gas resources from which natural gas cannot be delivered and marketed by pipeline systems. These two categories of resources represent a major percentage of the world's proven and possible energy reserves.

Fuel methanol plants may be used at the natural gas source or at the coal or lignite source to convert these resources to economically transportable fuel methanol. The methanol can be economically delivered to the coal or lignite source, where it is used with comminuted coal or lignite to produce Methacoal fuels. The Methacoal fuels are then transported to the thermal separation plant located at a new or retrofitted MICC power plant, where they are converted to clean condensate liquid fuels (CLF) and highly reactive pulverulent carbonaceous fuels (PCF). The CLF is burned in the gas turbine generator plant which produces electric power, and the PCF is burned in the steam boiler plant to provide steam for a steam turbine generator plant which also produces electric power. The gas turbine plant exhaust gases are all used, during normal operating conditions and load range requirements, as the principal source of combustion air for the steam boiler plant, supplemented as needed by ambient air or preheated ambient air. Excess heat is removed from the gas turbine exhaust gases prior to their use as combustion air to reduce ash fusion, slagging and ash buildup problems in the firebox and other parts of the boiler plant. The excess heat from gas turbine exhaust gases is used for reheating steam and/or for preheating boiler feedwater. The gas turbine generation plant and the steam turbine generation plant are sized with respect to one another so that they can provide the total generation capacity required and can also, during ordinary operating conditions and load range requirements, consume the CLF and PCF in essentially the same proportions at which they are produced from the Methacoal fuels.

On the basis of low fuel and operating costs plus estimated capital burden, atomic energy seemed like a good investment. Environmental concerns; avarice of contractors, utilities and bureaucrats; cost over-runs; unreliable safety systems; human shortcomings of operators, etc; have reversed the situation, bankrupting utilities and multiplying consumer rates. More recently the costs and difficulties of disposing of atomic wastes have been revealed and publicized. The facts are appalling. The price of electricity may well tripple. It is possible that the rest of the atomic plants in the United States will be shut down and scrapped. If the contaminated reactors and steam generators are removed, most of the rest of the equipment in these plants is usable as components of Methacoal Integrated Combined Cycle Power Plants, thereby converting liablities to assets.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. Improved means of providing low-capital-cost, fuel-integrated, fully-fired, combined cycle power plants, called Methacoal Integrated Combined Cycle (MICC) Power Plants, for utilizing anhydrous or low moisture content coal-methanol slurry fuels (Methacoal fuels), and capable of achieving very high energy conversion efficiencies and low-cost electric power generation, and also capable of substantially reducing exhaust gas emissions of nitrogen oxides, sulphur oxides and ultra-fine (one-tenth micron particle size range) particulates, compared to conventional coal-fired or conventional lignite-fired power plants which are not equipped with the most advanced chemical scrubbers, comprising:

a thermal separation plant for said Methacoal fuels for producing clean condensate liquid fuels (CLF), and highly reactive pulverulent carbonaceous fuels (PCF);

a gas turbine generator plant for burning said CLF, in liquid or vapor form, to produce electric power;

a steam boiler plant, or steam generator plant, for burning said PCF to produce steam for said electric power generation;

a relatively small firebox for said steam boiler plant, designed to accommodate the rapid-burning said PCF, provide near-optimum retention time for the products of combustion at the high firebox temperatures, and provide substantially complete combustion, limit the retention time sufficiently to minimize the formation of said nitrogen oxides, and minimize ash fusion problems and slagging problems in said firebox and in other parts of said steam boiler plant;

a steam turbine generator plant for using said steam to produce additional said electric power;

said gas turbine generator plant and said steam turbine generator plant sized in capacity, with respect to one another, to provide the total capacity desired, and to also allow the use of essentially all of said CLF and essentially all of said PCF, during normal operating conditions and ranges of load requirements, to allow adequate management of inventories of said CLF and said PCF as fuels for said MICC power plant;

means for utilizing essentially all of the gas turbine exhaust gases as the principal source of firebox combustion air for burning of said PCF in said firebox, during most of said normal operating conditions and said normal ranges of load requirements, to effect the recovery and reuse of most of the heat energy from said gas turbine exhaust gases for use in the generation of said steam.

2. The means as described in claim 1 comprising also:
receiving, handling and storage facilities for said Methacoal fuels to provide feedstock for the production of said CLF and said PCF, as fuels required for said MICC power plants.

3. The means as described in claim 1 comprising also:
fuel handling and storage facilities for said CLF and said PCF, to provide said CLF and said PCF in inventory for operation of said MICC power plants.

4. The means as described in claim 1 comprising also:
adequate flyash collection means to remove flyash from the exhaust gases of said steam boiler plant, and adequate means for disposal of said flyash in an acceptable manner to protect the quality of the environment.

5. The means as described in claim 1 comprising also:
heat exchanger means for removing excess heat from said gas turbine exhaust gases, prior to the use of said gas turbine exhaust gases as said firebox combustion air, for the purpose of minimizing said ash fusion problems, said slagging problems, and ash buildup problems in said firebox or in other parts of said steam boiler plant, thereby allowing the use of many coals or lignites which have such low ash fusion temperatures that they would not be useful or acceptable as pulverized coal or lignite fuels for coventional coal-fired or lignite-fired power plants, for the production of said Methacoal fuels for providing CLF and PCF for use in said MICC power plants; and heat exchanger means for removing and utilizing said excess heat from said gas turbine exhaust gases for preheating of boiler feedwater or for reheating of steam to provide superheated steam for the low-pressure steam turbines of said steam turbine generator plant, or for combinations, in variable amounts, of these two principal uses.

6. The means as described in claim 1 comprising also:
means for recovering some of the low-temperature exhaust gases from said steam boiler plant, after said flyash collectors, and for returning controlled amounts of said low-temperature exhaust gases to said firebox and to other high gas-temperature areas of said steam boiler plant for reducing the temperatures of said products of combustion, thereby minimizing said ash fusion and slagging problems, and further reducing the formation of said nitrogen oxides; and means for utilizing controlled amounts of said low-temperature exhaust gases from said steam boiler plant for admission to the gas stream of said products of combustion at various areas of said steam boiler plant for maintaining desirable gas velocities within said steam boiler plant and for thereby facilitating control of the temperature profile within said boiler plant during lowered firing rates.

7. The means as described in claim 1 comprising also:
means for utilizing existing coal-fired or lignite-fired power plants or existing oil-fired, gas/oil-fired, or gas-fired electric power plants so that they become integral parts of said MICC power plants, thereby providing retrofitted MICC power plants, which qualify also as what are sometimes called "repowered" plants, meaning that the source and/or type of fuel therefor has been changed.

8. The means as described in claim 1 comprising also:
means for utilizing the uncontaminated electric generating equipment, steam turbines and other power plant equipment and facilities, from nuclear power plants, which must be abandoned as nuclear power plants, so that said equipment and facilities which are utilized become integral parts of said MICC power plants, thereby providing retrofitted MICC power plants, and allowing the continued use of substantial portions of said nuclear power plants which are still in good operating condition.

9. The means as described in claim 1 comprising also:
means for utilizing a second, low-pressure, feedwater heating system for said steam boiler plant, in addition to the standard boiler-pressure feedwater heating system, in order to reduce the feedwater pressure requirements of the heat exchangers, or economizers, used for the initial heating of said boiler feedwater, and thus to reduce the costs of said heat exchangers used to recover said low-temperature heat energy from said boiler plant exhaust gases before theY are admitted to said exhaust stack, to thereby improve steam generation efficiencies.

10. The means as described in claim 1 comprising also:
air heater means for recovering said low-temperature heat energy from said boiler plant exhaust gases to provide some preheated combustion air for said gas turbine generator plants, which is beneficial in these plants, because said gas turbine generator plants will be burning said CLF, which is primarily fuel methanol, and methanol-burning gas turbines are not temperature-limited as are natural gas-fired and oil-fired gas turbines, and, since the ambient air will usually be at a lower temperature than said boiler feedwater, this allows recovering more of said low-temperature heat energy from said low-temperature exhaust gases from said steam boiler plant, for further improved MICC power plant efficiencies.

11. The means as described in claim 1 comprising also:
means for using CLF in its saturated vapor state, directly from said thermal separation plant, as fuel for the said gas turbine generator plants to further improve the overall MICC power plant efficiencies.

12. The means as described in claim 1 comprising also:
heat exchanger means in said steam boiler plant to recover said low-temperature heat energy from said exhaust gases for use in vaporizing stored liquid said CLF for burning as fuel in the said gas turbine generator plants to further improve the overall MICC power plant efficiency.

13. The means as described in claim 1 comprising also:
means for cycling power output of said gas turbine generator plants and said steam turbine generator plants up and down, together, at or near the ratio of power production which will consume said CLF and said PCF at near the same ratio as they are produced from said Methacoal fuels, to assist in maintaining balanced inventories of said CLF and said PCF, as fuels for said MICC power plants.

14. The means as described in claim 1 comprising also:

mechanical gas-moving means, after the gas turbine exhaust gas heat exchangers, for maintaining control of exhaust gas pressures from said gas turbine generator plants, and for maintaining control of the flow and pressures of said gas turbine exhaust gases used as said combustion air for burning of said PCF in burners of said fireboxes of said steam boiler plants; and mechanical gas-moving means for maintaining control of pressures of said boiler plant exhaust gases after said flyash collectors and before said exhaust stack of said steam boiler plant, in controlled functional relationship with said means for controlling said exhaust gas pressures from said gas turbine generator plants, while also maintaining control of gas pressures within said fireboxes and housings of said steam boiler plants, and providing sufficient pressure to move said boiler plant exhaust gases up the exhaust stack therefrom for discharge to the atmosphere.

15. The means as described in claim 1 comprising also:

means for thermally removing most of said methanol from said Methacoal fuels received at said MICC power plants, and replacing said methanol with water to provide improved, methanol-altered, coal-water slurry fuels for combustion in said fireboxes of said steam boiler plants, instead of the dry, powdered said PCF generally used as fuel for said steam boiler plants, thus allowing storage and handling of fuel for said steam boiler plants in the fluid, or slurry, form, rather than in the particulate solids form of said PCF.

16. The means as described in claim 1 comprising also:

means for removing organic and inorganic sulphur from said PCF, as an intergal part of said thermal separation process, for producing said CLF and said PCF from said Methacoal fuels.

17. Improved means of providing low-cost electric power at the point of need; of providing low-capital-cost new or retrofitted electric power generation facilities; of utilizing distant low-sulphur coal and/or lignite resources or distant low-sulphur coal and/or lignite resources in conjunction with remote, low-value natural gas resources, to provide high-quality, clean-burning, economically transportable fluid fuels; of utilizing said fluid fuels and specially designed combined cycle power generation facilities for achieving very high energy conversion efficiencies, comparable to gas-fired combined cycle power plants with exhaust gas heat recovery steam generators and steam electric power generation systems; and of providing very low sulphur oxides emissions, substantially reduced nitrogen oxides emissions, and greatly reduced emissions of ultra-fine, one-tenth micron particle-size range, vaporized and then recondensed, heavy-metal laden, (probably cacinogenic) particulate materials, compared to the conventional coal-fired, lignite-fired and residual oil-fired electric power plants; comprising:

a Methacoal (coal-methanol slurry, or suspensoid) fuels production plant proximate said coal or said lignite resource to comminute said coal or lignite and combine comminuted said coal or lignite with methanol or fuel methanol to produce low moisture content Methacoal fuels;

a methanol plant proximate said natural gas resource, to convert said natural gas to said methanol, if said natural gas is to be used as the feedstock for producing said methanol;

a methanol plant proximate said coal or lignite resource, to convert said coal or lignite to said methanol, if said coal or lignite is to be used as the feedstock for producing said methanol;

transportation means to move said methanol to said Methacoal fuels production plant, if said natural gas is used as the feedstock for production of said methanol;

transportation means for delivering said Methacoal fuels from said Methacoal fuels production plant to said thermal separation plant, including specially designed suspensoid fluid pipelines, for taking advantage of the stabilized, shear-thinning characteristics of said Methacoal fuels to reduce pipe costs, pump costs, wear on tubing, and also pumping power consumption;

a thermal separation plant for Methacoal fuels, proximate said MICC power plant, at a load center or electric power line distribution point, for producing clean condensate liquid fuels (CLF) and highly reactive pulverulent carbonaceous fuels (PCF) from said Methacoal fuels, such citing of said methanol, Methacoal and MICC power plants minimizing costs of transportation means and also cost of transportation;

gas turbine generator plants fueled by said CLF, in either liquid form or gaseous forms, for producing said electric power;

high efficiency steam boiler plants for producing steam for said steam turbine electric power generation by burning said PCF;

means for utilizing essentially all of the hot exhaust gases from said gas turbine generator plant as combustion air for burning of said highly reactive PCF in the uniquely small fireboxes of said steam boiler plant to provide maximum recovery and reuse of heat energy of said hot gas turbine exhaust gases;

steam turbine generator plants using said steam to produce additional said electric power; and said gas turbine generator plants and said steam turbine generator plants sized with respect to one another to provide the total power generating capacity required, and to also consume both said CLF and said PCF, during normal operating conditions and load range requirements, in approximately the ratio they are delivered and produced from said Methacoal fuels in said thermal separation plant.

* * * * *